United States Patent
Mogul et al.

(10) Patent No.: US 9,755,978 B1
(45) Date of Patent: Sep. 5, 2017

(54) METHOD AND SYSTEM FOR ENFORCING MULTIPLE RATE LIMITS WITH LIMITED ON-CHIP BUFFERING

(71) Applicant: Google Inc., Mountain View, CA (US)

(72) Inventors: Jeffrey Clifford Mogul, Menlo Park, CA (US); Jakov Seizovic, Los Gatos, CA (US); Benjamin Charles Serebrin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 14/632,464

(22) Filed: Feb. 26, 2015

Related U.S. Application Data

(60) Provisional application No. 61/991,858, filed on May 12, 2014.

(51) Int. Cl.
*H04L 12/815* (2013.01)
*H04L 12/851* (2013.01)
*H04L 12/865* (2013.01)

(52) U.S. Cl.
CPC ...... *H04L 47/2441* (2013.01); *H04L 47/6275* (2013.01)

(58) Field of Classification Search
CPC . H04L 47/2441; H04L 47/6275; H04L 47/12; H04L 45/586; H04L 49/70; H04L 12/4633; H04L 12/4641; H04L 12/4666; H04L 12/00; H04L 41/0893; H04L 45/00; H04L 45/38; H04L 47/11; H04L 47/24; H04L 47/263; H04L 49/90; H04L 49/9068; H04L 63/0227; H04L 63/1408; H04L 69/16; H04L 67/325; G06F 9/45533;

(Continued)

(56) References Cited

U.S. PATENT DOCUMENTS 6,952,401 B1  10/2005  Kadambi et al.
6,987,733 B2  1/2006  Mukouyama et al.

(Continued)

FOREIGN PATENT DOCUMENTS

WO  2013158115 A1  10/2013
WO  2014021839 A1  2/2014

OTHER PUBLICATIONS

Radhakrishnan, et al., SENIC: Scalable NIC for End-Host Rate Limiting, 2013.

(Continued)

*Primary Examiner* — Alina N Boutah
(74) *Attorney, Agent, or Firm* — Lerner, David, Littenberg, Krumholz & Mentlik, LLP

(57) ABSTRACT

The present application describes a system and method for rate limiting traffic of a virtual machine (VM). In this regard, a VM bypasses a hypervisor and enqueues a packet on an assigned transmission queue. Based on information contained in the packet, the NIC determines whether the packet is to be delayed or transmitted immediately. If the NIC determines that the packet is to be transmitted immediately, the packet is moved to one of a plurality of primary output queues to be transmitted to the external network. If the packet is to be delayed, the packet is moved to one of a plurality of rate limited secondary output queues. In this regard, the NIC classifies the packets, thereby improving performance by allowing high-rate flows to bypass the hypervisor.

19 Claims, 10 Drawing Sheets

(58) Field of Classification Search
CPC ............... G06F 9/45558; G06F 9/5077; G06F 2009/4557; G06F 2009/45595; G06F 21/50
USPC ....... 370/235, 389, 230, 343, 351, 412, 236, 370/395.4; 718/1, 105; 709/223, 224, 709/229, 239, 240
See application file for complete search history.

(56) References Cited

U.S. PATENT DOCUMENTS

| | | | |
|---|---|---|---|
| 7,382,728 | B2 | 6/2008 | Chen et al. |
| 7,539,134 | B1 | 5/2009 | Bowes |
| 7,636,308 | B2 | 12/2009 | Kwon |
| 8,462,780 | B2 | 6/2013 | Vincent et al. |
| 8,477,610 | B2 * | 7/2013 | Zuo .......................... H04L 47/20 370/230 |
| 8,499,151 | B2 | 7/2013 | Durham et al. |
| 8,566,822 | B2 | 10/2013 | Diab et al. |
| 8,599,830 | B2 | 12/2013 | Karaoguz et al. |
| 2004/0160914 | A1 | 8/2004 | Sarkar |
| 2005/0122966 | A1 | 6/2005 | Bowes |
| 2008/0259798 | A1 | 10/2008 | Loh et al. |
| 2010/0061235 | A1 | 3/2010 | Pai et al. |
| 2010/0211946 | A1 * | 8/2010 | Elzur .................. G06F 9/45537 718/1 |
| 2011/0019531 | A1 * | 1/2011 | Kim ...................... G06F 11/203 370/216 |
| 2011/0019552 | A1 * | 1/2011 | Karaoguz ............... H04L 45/00 370/236 |
| 2011/0023029 | A1 * | 1/2011 | Diab ..................... G06F 9/5077 718/1 |
| 2011/0103389 | A1 * | 5/2011 | Kidambi ............... H04L 45/586 370/395.1 |
| 2012/0250511 | A1 | 10/2012 | Neeser |
| 2013/0019042 | A1 * | 1/2013 | Ertugay ................ G06F 13/385 710/267 |
| 2013/0227685 | A1 | 8/2013 | McGee |
| 2013/0246619 | A1 | 9/2013 | Raja et al. |
| 2013/0343191 | A1 * | 12/2013 | Kim ........................ H04L 47/11 370/235 |
| 2013/0343399 | A1 * | 12/2013 | Kandula ............... G06F 9/5077 370/412 |
| 2014/0115578 | A1 * | 4/2014 | Cooper .................. G06F 21/606 718/1 |
| 2015/0146527 | A1 * | 5/2015 | Kishore .............. H04L 47/2441 370/230.1 |
| 2016/0044695 | A1 * | 2/2016 | Gunner ................... H04L 47/00 370/336 |
| 2016/0301601 | A1 | 10/2016 | Anand et al. |

OTHER PUBLICATIONS

Radhakrishnan, et al, NicPic: Scalable and Accurate End-Host Rate Limiting, 2013.
Broadcom Ethernet Network Controller Enhanced Virtualization Functionality, Broadcom Corporation, Oct. 2009.
Keller, Eric, et al., NoHype: Virtualized Cloud Infrastructure without the Virtualization, Princeton University, © 2010.
Ram, Kaushik Kumar, et al., sNICh: Efficient Last Hop Networking in the Data Center, HP Laboratories, © 2010.
Mogul, Jeffrey C., et al., The NIC is the Hypervisor: Bare-Metal Guests in IaaS Clouds, HP Labs, Palo Alto, 2013.

* cited by examiner

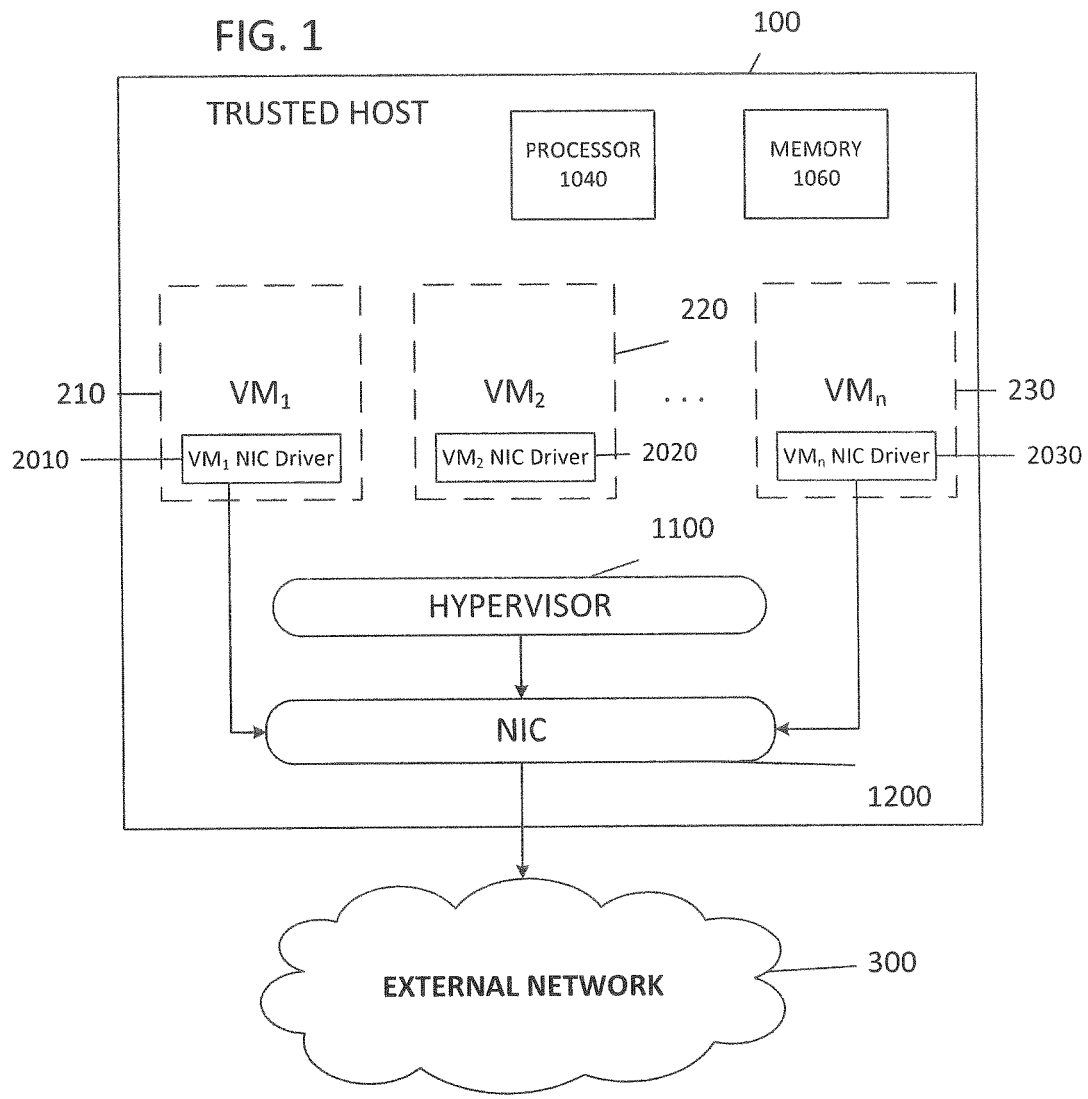

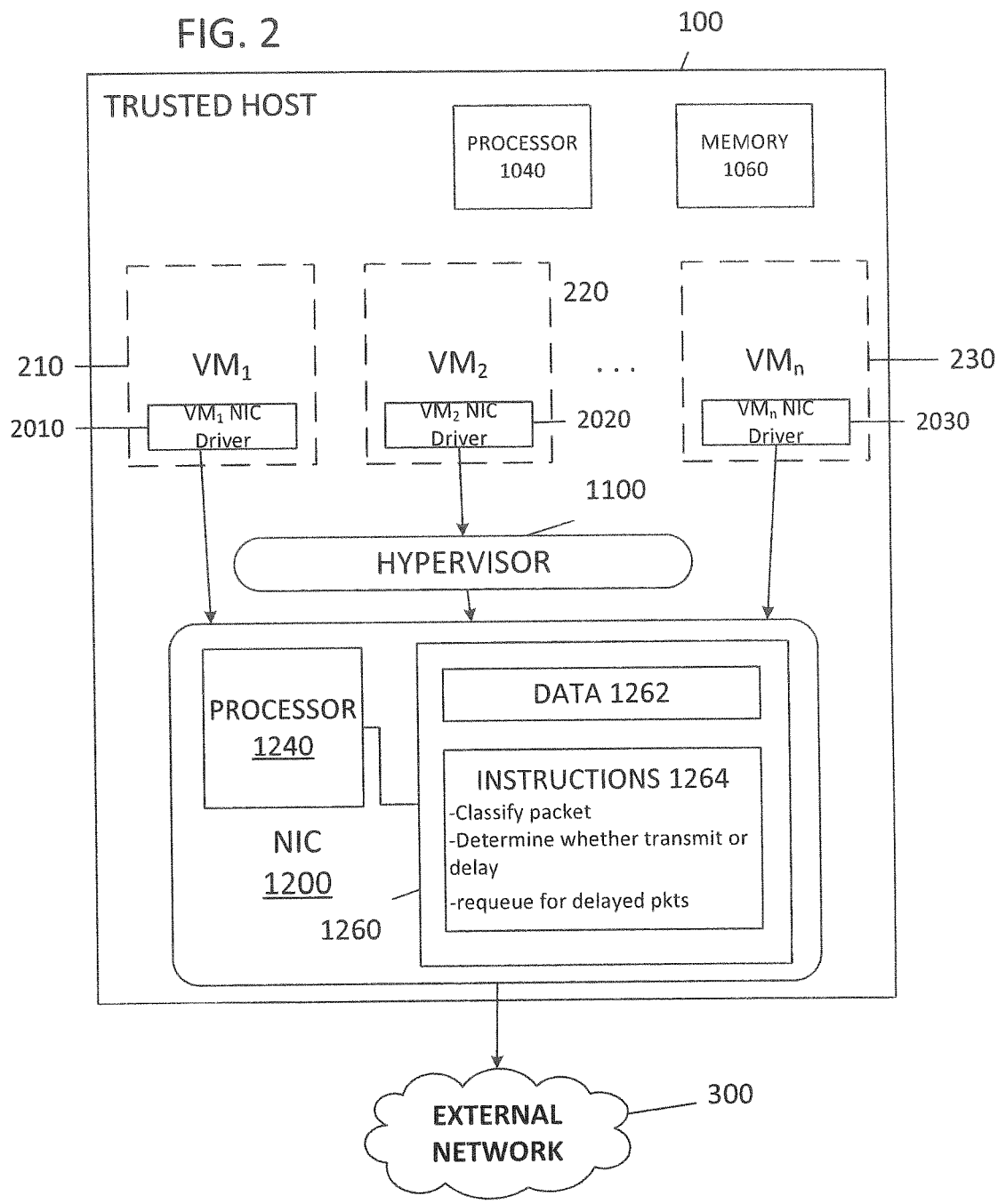

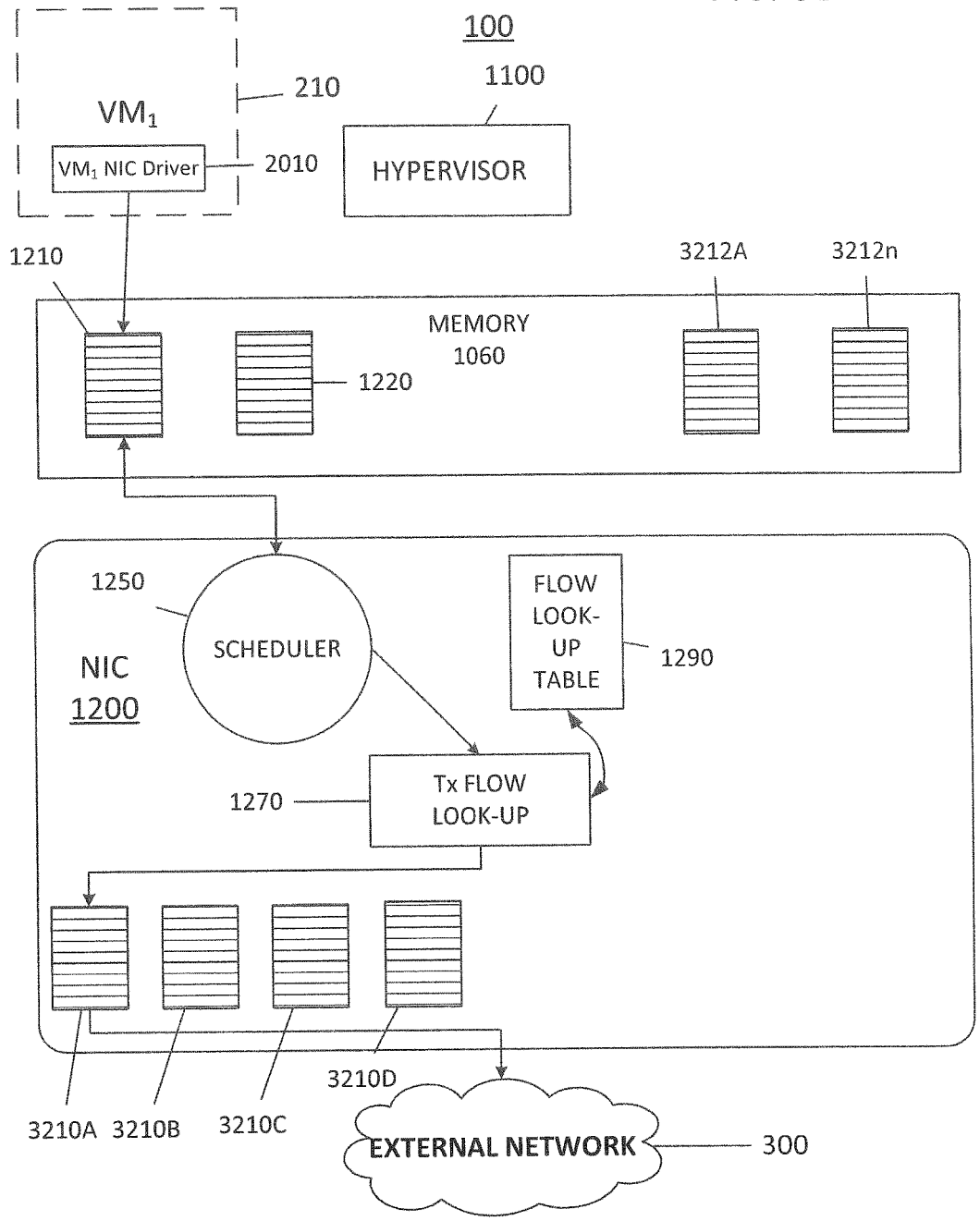

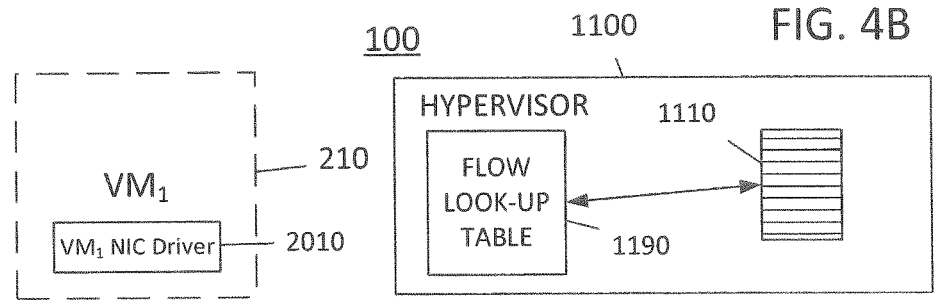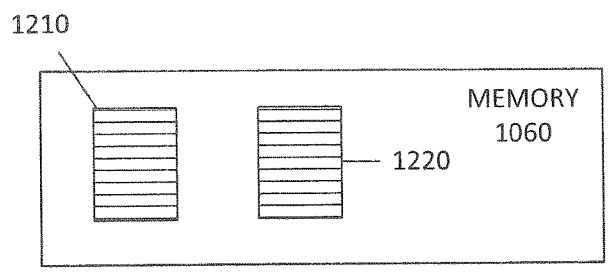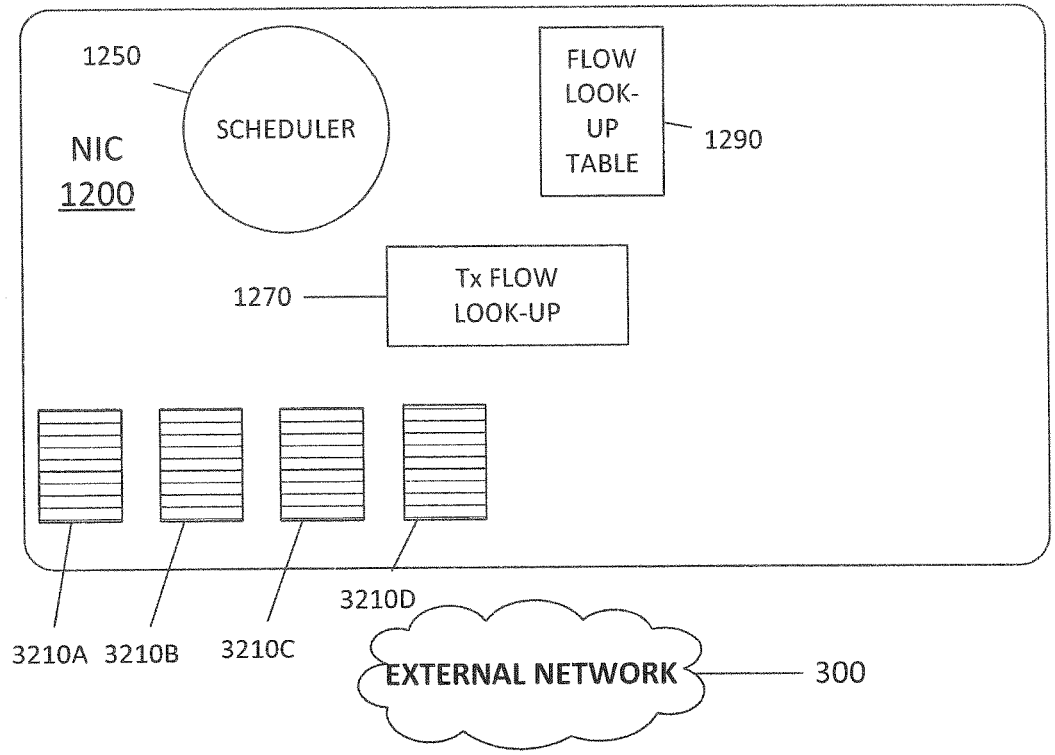
FIG. 4B

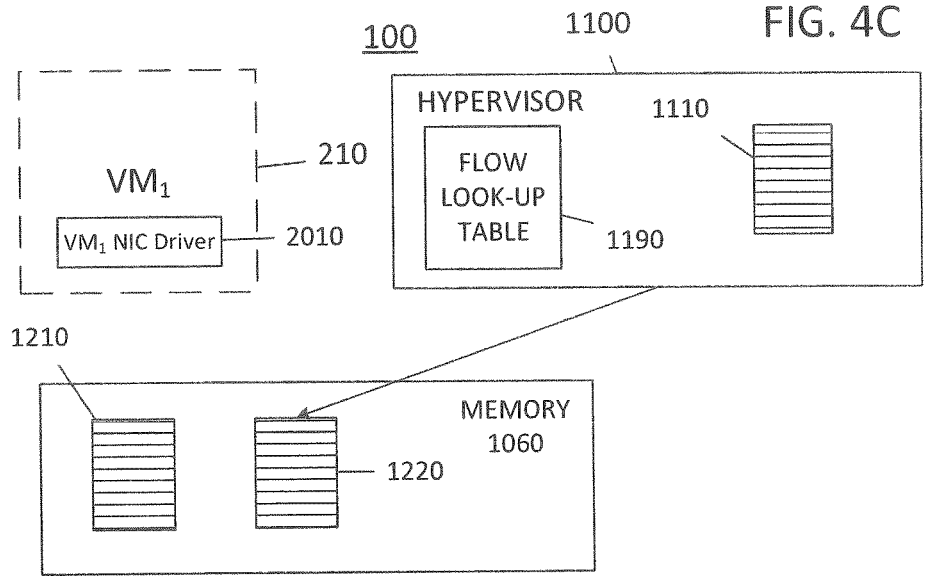
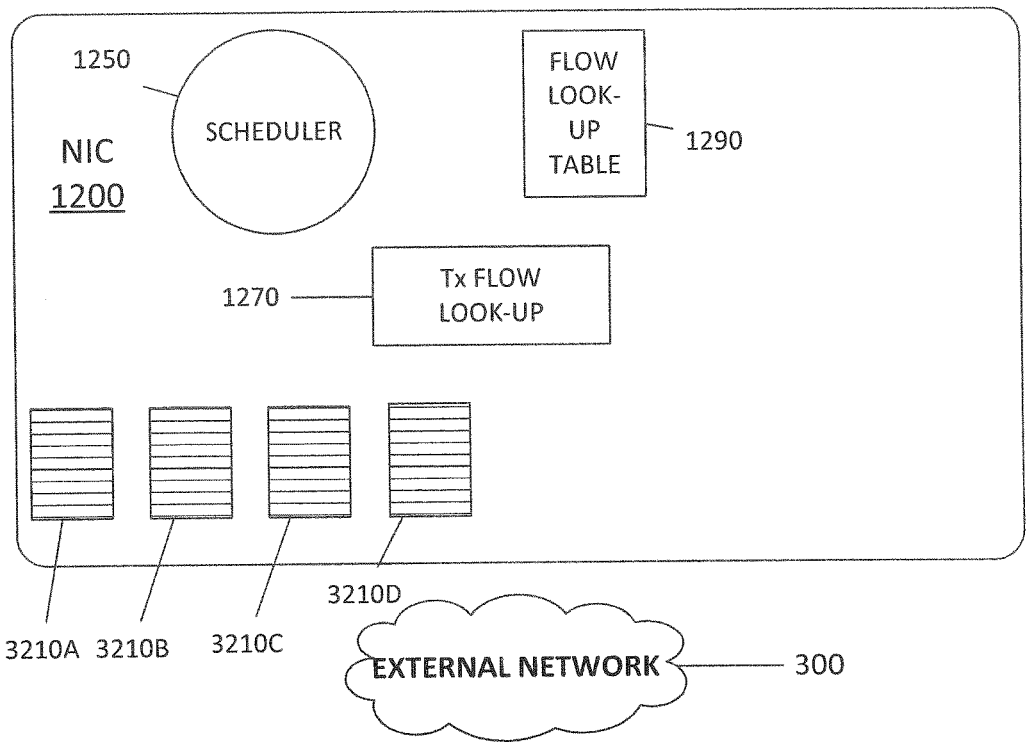
FIG. 4C

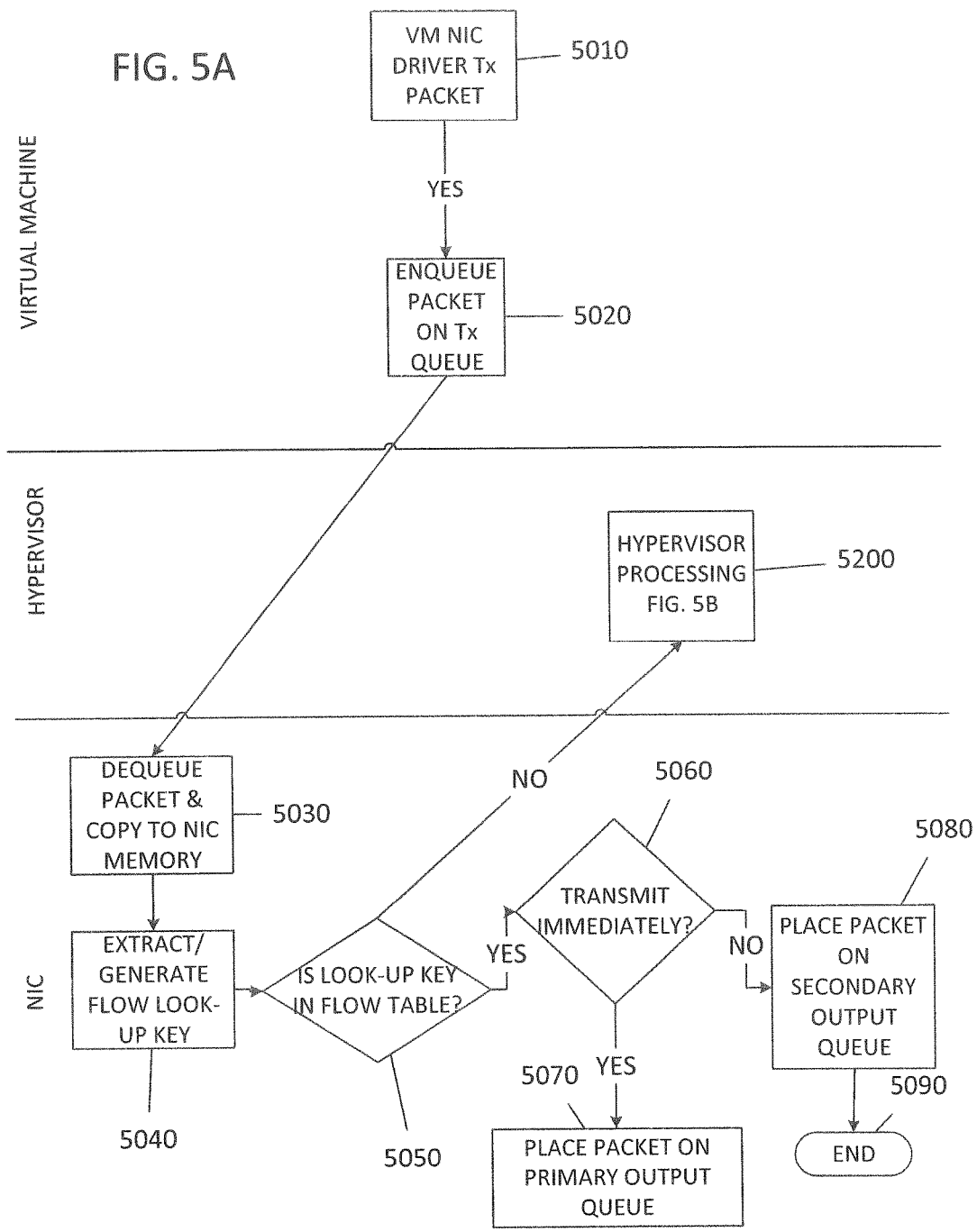

METHOD AND SYSTEM FOR ENFORCING MULTIPLE RATE LIMITS WITH LIMITED ON-CHIP BUFFERING

CROSS-REFERENCE TO RELATED APPLICATIONS

This application claims priority to provisional application No. 61/991,858, entitled "Method and System for Enforcing Multiple Rate Limits with Limited On-Chip Buffering," filed on May 12, 2014, the disclosure of which is herein incorporated by reference herein in its entirety.

This application is related to commonly owned co pending U.S. application Ser. No. 14/632,449, entitled "Method and System and Validating Rate-Limiter Determination Made by Untrusted Software," the disclosure of which is hereby incorporated by reference in its entirety.

BACKGROUND

In systems that include a plurality of virtual machine environments, trusted host software, such as a hypervisor or virtual machine manager, is needed to manage network resources. In particular, these virtual machines are required to share network bandwidth. In order to enforce bandwidth sharing amongst the virtual machines, a trusted host may implement rate limiting.

Rate limiting is a technique used to limit traffic sent and received by the virtual machines. In particular, there are two types of rate-limiting: hardware rate limiting and software rate limiting.

Hardware rate limiting is performed by a network interface controller (NIC). In this regard, a limited number of hardware transmission queues are supported by the NIC. In transmitting a packet, the operating system will transmit a packet to the NIC, thereby notifying it of the packet and the appropriate transmission buffer to use. The NIC will subsequently decide the order in which the received packets are transmitted. However, the limited number of hardware transmission queues do not scale well and require a large amount of memory, which increases the cost associated with hardware rate limiting.

Software rate limiting is typically performed by a hypervisor. In this regard, a plurality of software transmission queues are provided in the hypervisor. The hypervisor receives packets from the virtual machines and transmits them to the NIC in batches based on rate limiting classification. In this regard, the packet flow and other rate limiting policies are enforced by the hypervisor. This results in high overhead with the trusted host's processor. Additionally, the hypervisor does not have control of the packets once they are transmitted to the NIC, so packets may be transmitted out-of-order or at unpredictable times.

SUMMARY

The present application describes a system and method that includes a trusted host with a plurality of virtual machines (VMs). The trusted host includes a processor, a memory, at least one hypervisor, and at least one network interface controller (NIC). The NIC includes at least a processor, a scheduler, a memory containing a plurality of hardware transmission queues, and at least one connection to an external network. In this regard, the NIC exposes one rate limited transmission queue to each of the virtual machines. Each virtual machine further includes a virtual network interface controller (vNIC) for enqueuing packets on the hardware rate limited transmission queue of the NIC.

When the virtual machine transmits a packet, the vNIC may bypass the hypervisor and enqueues the packet on its assigned hardware transmission queue of the NIC. The scheduler dequeues packets, or a portion thereof, from the VM's hardware transmission queue and transfers it to a high-speed memory of the NIC. The NIC's processor generates a flow look-up key from the packet information transferred to the high-speed, searchable memory. The processor of the NIC will compare the generated flow look-up key to entries in a transmission flow look-up table stored in the memory of the NIC. If the flow look-up key matches one of the entries in the transmission flow look-up table, the packet is re-enqueued on one of a plurality of rate limited hardware output queues, as indicated by the entry in the flow look-up table. If the generated flow look-up key does not match one of the entries, the NIC may either drop the packet or forward it to the hypervisor for further processing. In this regard, the NIC classifies the packet, thereby improving performance by allowing high-rate flows to bypass the hypervisor and preventing the virtual machines from miss-queuing the packets.

One example described in the present application includes a computer-implemented method that receives at packets on a transmission queue assigned to a virtual machine (VM). The method then classifies the packets based on an entry in a transmission flow look-up table. Based on the classification, the NIC determines whether the at least one packet should be delayed or transmitted immediately. If the packets are to be delayed, then the packets are re-enqueued on one of a plurality of rate limited output queues as indicated by the entry in the flow look-up table. If the packets are to be transmitted immediately, then the packets are transmitted to an external network immediately.

According to some examples, there are a plurality of rate limited output queues. In these examples, a virtual machine cannot access the plurality of rate limited output queues directly.

In other examples, the method includes dequeuing the packets from the transmission queue, according to a scheduling algorithm.

In another example, re-queuing the packets on the rate limited output queue includes updating a queue descriptor to point to the packets in the transmission queue.

Another example describes a system that includes at least one memory that stores at least one transmission queue to receive packets from a virtual machine (VM). The system may include additional memory that stores a transmission look-up table that has at least one entry to classify the at least one packet. The system also includes one or more processors to determine whether the packets should be delayed or transmitted immediately based on the classification.

In some examples, the system has at least one rate limited output queue to re-queue the packets that are determined to be delayed. Other examples show that the virtual machine cannot access the at least one rate limited output queue.

Another example of re-queuing the packet on the rate limited output queue includes updating a queue descriptor to point to the packets in the transmission queue.

An example of the one or more processors includes transmitting the packets to an external network immediately if the one or more processors determine that the packets should be transmitted immediately.

In some examples, the system includes a scheduler to transfer the packets from the transmission queue to a memory. Transferring the packets from the transmission queue to the searchable memory may include dequeuing it from the transmission queue.

An example of a non-transitory computer readable medium that includes instructions to receive packets on a transmission queue assigned to a virtual machine (VM) are also described. The non-transitory computer readable medium may also include instructions that classify the at least one packet based on at least one entry in a transmission flow look-up table. The non-transitory computer readable medium may include instructions that determine whether the packets should be delayed or transmitted immediately. If the packets are to be delayed, they will be re-enqueue the at least one packet on a rate limited output queue if the packet is to be delayed based on the classification. Further, the instructions may also transmit the packets immediately if they are determined to be transmitted immediately.

In some examples, non-transitory computer readable medium may also include instructions that update a queue descriptor to point to the packets in the transmission queue when the packets are to be re-queued on a rate limited output queue.

As noted above, one of the advantages of the system, method, and non-transitory computer-readable medium described herein is realized by bypassing the hypervisor. Additionally, the transmission of packets is further optimized by having the hardware of the NIC perform the rate limit classification of the packet.

BRIEF DESCRIPTION OF THE DRAWINGS

FIG. 1 is a schematic of virtual machines bypassing the hypervisor;

FIG. 2 illustrates a schematic of virtual machines bypassing the hypervisor with additional components of the Network Interface Controller;

FIGS. 3A-3C shows an example of the virtual machines bypassing the trusted host hypervisor to enqueue packets on a hardware transmission queue;

FIGS. 4A-4C shows another example of the Network Interface Controller forwarding the packet to the hypervisor; and FIGS. 5A and 5B show a flowchart for the processing of packets.

DETAILED DESCRIPTION

Figure 3A:
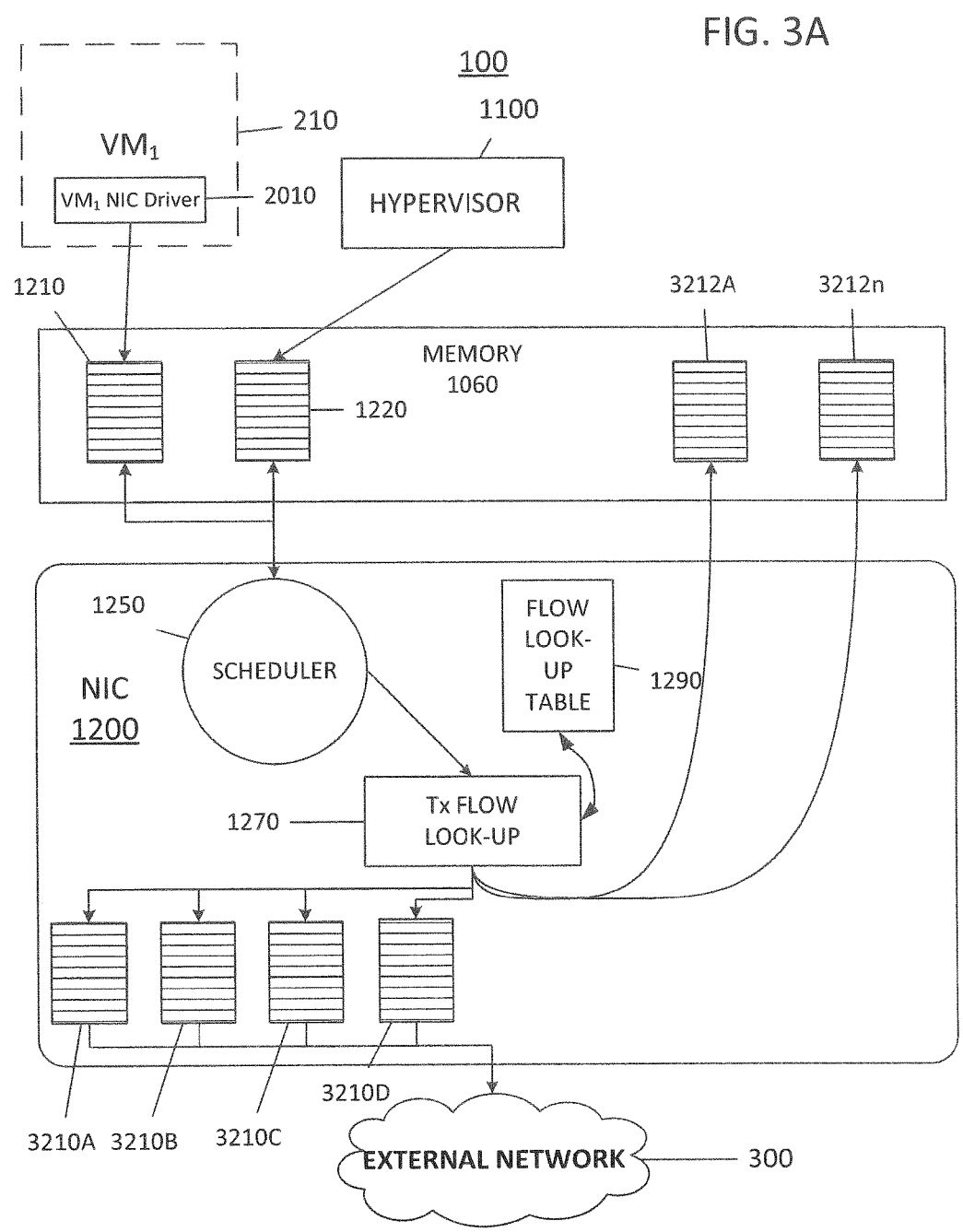

The present disclosure relates to a system, method, and computer-readable medium for a network interface controller (NIC) to enforce rate limits set by a trusted host system. In conventional virtual machine (VM) environments, virtual machines transmit packets to a hypervisor, which then classifies and enqueues the packet on a transmission queue of the NIC. This is a resource intensive process. To address this problem, some systems allow the virtual machine to bypass the hypervisor and enqueue the packet on the appropriate rate limited transmission queue. However, some VMs will attempt to take advantage of the system by enqueuing packets improperly, for example on a transmission queue with a higher rate limit. Enforcing rate limits set by a trusted host system allows for improved performance by allocating bandwidth appropriately while being invisible to the untrusted VM.

According to the present disclosure, a VM enqueues packets to a hardware transmission queue associated with the VM. In this regard, the hardware transmission queue is associated with the VM in a one-to-one relationship.

Then, the NIC's scheduler may dequeue the packet from the hardware transmission queue and place the packet in a memory of the NIC, for example an SRAM buffer. In some examples, only a portion of the packet, such as the header, will be placed in the searchable memory.

Next, the NIC will perform a classification step of the packet located in the memory. In this regard, a look-up key, such as a hash or normalized portion of the packet, will be used to find an entry in a transmission flow look-up table located on the NIC.

If the packet or header information matches an entry in the transmission flow look-up table, the packet is enqueued on the specific secondary rate-limiting transmission queue as indicated in the matching entry. In this regard, the NIC may have a plurality of secondary queues for each VM, wherein each of the secondary queues has its own associated rate limit. There are also entries in the transmission flow look-up table that indicate that the packet is to be dropped, forwarded to the hypervisor, or transmitted immediately.

If the look-up key does not match an entry in the transmission flow look-up table, the packet is either dropped or routed to a hypervisor for further processing.

In some examples, the secondary queues are a pool of host DRAM memory. Thus, re-queuing the packet to a secondary queue located in the DRAM de-allocates more of the NIC's memory (i.e., SRAM buffer) faster. Therefore, the NIC can classify incoming packets in a more efficient manner.

FIG. 1 illustrates a virtual machine (VM) environment where the virtual machines (VMs) may bypass a hypervisor to transmit packets to an external network. In this regard, the VM environment includes at least one trusted host 100 connected to an external network 300. Although only one trusted host 100 is shown in FIG. 1, one of ordinary skill in the art would recognize that several trusted hosts may exist in a data center or server farm. The trusted host includes a plurality of virtual machines (VMs) 210, 220, and 230, a hypervisor 1100, and a network interface controller (NIC) 1200. The trusted host 100 may also include at least one processor 1040 and at least one memory 1060.

The trusted host 100 may be any type of computing device capable of hosting VMs. In this regard, the trusted host 100 may be a server, preferably one located in a server farm or a data center. The processor 1040 of the trusted host 100 may be any conventional processor, such as processors from Intel Corporation or Advanced Micro Devices. Alternatively, the processor may be a dedicated controller such as an application specific integrated circuit (ASIC), field programmable gate array (FPGA), etc. Additionally, the processor 1040 of the trusted host 100 may include multiple processors, multi-core processors, or a combination thereof. Accordingly, references to a processor will be understood to include references to a collection of processors or dedicated logic that may or may not operate in parallel.

The memory 1060 of the trusted host stores information accessible by the processor, including instructions and data that may be executed or otherwise used by the processor. The memory the trusted host may also store the trusted host's operating system and the hypervisor 1100. In this regard, the memory 1060 may be of any type capable of storing information accessible by the processor, including a computer-readable medium, or other medium that stores data that may be read with the aid of an electronic device, such as a hard-drive, memory card, flash drive, ROM, RAM, DRAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

In operation, the trusted host 100 may run an operating system that manages the VMs. In this regard, the operating system includes a hypervisor, such as hypervisor 1100, or a virtual machine manager (VMM). For the purposes of this application, hypervisor and VMM may be used interchangeably. Further, one of ordinary skill in the art would recognize that the operating system of the trusted host 100 may be Linux, Windows™, or any other suitable operating system capable of supporting virtual machines.

The hypervisor 1100 may manage each VM such that the VMs appear to be isolated from one another. That is, each VM 210, 220, and 230 believes itself to be an independent machine with its own hardware resources. In this regard, the hypervisor 1100 may control the VMs access to the trusted host's resources (i.e. memory, network interface controller, etc.). The hypervisor 1100 may implement a hardware virtualization scheme that allocates hardware resources to the VMs as necessary. According to some examples, the NIC 1200 is one of the hardware resources that VMs 210, 220, and 230 interact with via the hypervisor 1100.

The VMs 210, 220, and 230 are software implementations of a computer. That is, VMs 210, 220 and 230 execute an operating system. While only three VMs are shown in the figures, one of ordinary skill in the art would recognize that any number of VMs may be supported by the trusted host 100. The operating system of the various VMs 210, 220, and 230 may be the same operating system as the trusted host, but do not necessarily have to be. Moreover, the operating system of each VM may be different from other VMs. For example, the trusted host 100 may run a Linux-based operating system, while the VM 210 may run a Windows™ operating system and the VM 220 may run a Solaris™ operating system. The various combinations of operating systems would be readily apparent to those skilled in the art and are not discussed in greater detail herein.

Each VM includes its own virtual network interface controller (vNIC) 2010, 2020, and 2030. Each vNIC 2010, 2020, and 2030 may include a transmission look-up table (not shown). The vNICs may transmit and receive packets for the VM. In this regard, the vNICs may format or otherwise prepare the packet for transmission on the external network 300.

External network 300 may comprise various configurations and use various protocols including the Internet, World Wide Web, intranets, virtual private networks, local Ethernet networks, private networks using communication protocols proprietary to one or more companies, cellular and wireless networks (e.g., WiFi), data center networks, and various combinations of the foregoing. Although only one trusted host is depicted in FIG. 1, it should be appreciated that a typical system can include a large number of connected computers, trusted hosts, and VMs.

In operation, the VMs 210, 220, and 230 of FIG. 1 communicate with other destinations (i.e., other VMs, physical machines, servers, storage arrays, etc.). For example, the vNIC 2010 receives a packet from the operating system of VM 210. The VM 210 then bypasses the hypervisor 1100 to enqueue the packet directly on a transmission queue 1210 as described in greater detail below. The VM 230 would also bypass the hypervisor 1100 to enqueue its packets on another transmission queue allocated to VM 230. Although, the examples described herein refer to hypervisor bypass, one of ordinary skill in the art would recognize that hypervisor passthrough may be used to enqueue the packets on the transmission queues. Subsequently, the NIC 1200 may dequeue the packets to perform rate limit classification as described in greater detail below.

Turning to FIG. 2, an example of the hypervisor bypass is shown. The system includes a trusted host 100 and external network 300 as discussed above. Similarly, the trusted host 100 includes VM 210, VM 220, VM 230, a hypervisor 1100, and a NIC 1200. Each VM includes its own virtual network interface controller (vNIC) 2010, 2020, and 2030. According to this example, the NIC is shown with a processor 1240 and memory 1260, which may include data 1262 and instructions 1264. Processor 1240 may be one of the processors discussed above or a combination thereof. In other examples, the processor 1240 may be fixed-function hardware configured to perform the examples described herein. Additionally, memory 1260 may be any type of memory previously discussed or a combination thereof. While only one memory is shown in FIG. 2, one of ordinary skill in the art will appreciate that this is merely illustrative and the NIC 1200 may include additional memories of various types.

The instructions 1264 may be any set of instructions to be executed directly (such as machine code) or indirectly (such as scripts) by the processor 1240. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. The instructions may be executed to, for example, dequeue packets from the transmission queues, determine whether a packet is to be transmitted immediately or delayed, re-queuing packets on rate limited output queues when they are to be delayed, etc. Functions, methods and routines of the instructions are explained in more detail below.

The data 1262 may be retrieved, stored or modified by processor 1240 in accordance with the instructions 1264. For instance, although the system and method are not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

Turning to FIG. 3A, an example of the hypervisor bypass and the various communication paths are shown. In this regard, the system includes a trusted host 100 and external network 300 as discussed above. Similarly, the trusted host 100 includes at least one processor (not shown) the memory 1060, VM 210, VM 220, VM 230, a hypervisor 1100, and a NIC 1200. Each VM includes its own virtual network interface controller (vNIC) 2010, 2020, and 2030. Each vNIC 2010, 2020, and 2030 may include a transmission look-up table (not shown).

The memory 1060 includes transmission queues 1210 and 1220 and the secondary output queues 3212A and 3212n. In this regard, the transmission queue 1210 is allocated to VM 210 and the transmission queue 1220 is allocated to the hypervisor 1100. While FIG. 3A only shows two transmission queues, one of ordinary skill in the art would recognize that each VM may have a transmission queue allocated to it by the hypervisor 1100. In operation, one transmission queue is allocated to each VM.

While FIG. 3A shows two secondary output queues 3212A and 3212n, one of ordinary skill in the art would recognize that any number of secondary output queues may be used. Each of the secondary output queues may be allocated to handle a particular class of network traffic, a priority associated with the network traffic, or a specific destination (i.e. particular machines, another trusted host with a plurality of virtual machines, a storage area network, a specific data center, etc.) or any combination thereof. Further, the secondary output queues may be invisible to the VMs. That is, the VMs cannot directly access the secondary output queues.

The secondary output queues may be located in a high-speed volatile memory of the trusted host 100. This high-speed volatile memory may be dynamic random access memory (DRAM) or any suitable high-speed volatile memory. In this regard, the high-speed volatile memory may be capable of holding more than 10,000 rate limited secondary output queues.

The NIC 1200 includes a plurality of hardware primary output queues 3210A, 3210B, 3210C, and 3210D; a scheduler 1250; a transmission flow-look-up 1270; and a flow look-up table 1290. The primary output queues 3210 may be invisible to the VMs. That is, the VMs cannot directly access the primary output queues 3210.

In operation, the transmission queue 1210 receives packets from its respective VM 210. Likewise, the transmission queue 1220 may receive packets from the hypervisor 1100. In this regard, the transmission queues may be first-in first-out type of queues, or another type of transmission queue, such as transmission ring buffers or a last-in first-out queues.

The scheduler 1250 may be any type of scheduling algorithm, such as round-robin or any suitable scheduling algorithm may be used. In this regard, the scheduler may dequeue packets from the transmission queues 1210 and 1220 so the NIC may determine whether the packet is to be transmitted immediately via a primary output queue 3210 or enqueued on a secondary rate limited output queue for later transmission. Further, the scheduler 1250 may dequeue packets from the secondary output queues on to one of the primary output queues (e.g., 3210A, 3210B, etc.). Accordingly, another scheduler (not shown) dequeues packets from the primary output queues on to the external network 300.

Classifying packets and enqueuing them in accordance with the examples described above de-allocates more of the NIC's memory (i.e., SRAM buffer) faster, thereby allowing the NIC to classify incoming packets in a more efficient manner. In this regard, high packet flows that comply with rate limits set by the trusted host are permitted.

The transmission flow look-up 1270 may include a memory, such as an SRAM buffer or any other suitable high-speed memory. In some examples, transmission flow look-up 1270 may include instructions for comparing a flow look-up key to entries in a transmission flow look-up table 1290.

The transmission flow look-up table 1290 may be any suitable table or database capable of indexing and storing information for classifying the appropriate rate limited transmission queue for the packet. The transmission flow look-up table may be stored in a memory located on the NIC, such as a content addressable memory (CAM), ternary content addressable memory (TCAM), SRAM, DRAM, or any other suitable memory. In this regard, the transmission flow look-up 1270 may use the transmission flow look-up table 1290 to determine whether the flow look-up key is stored therein. Further, the transmission flow look-up table 1290 may include an entry indicating the priority or the class of traffic of the packet. This information may help the NIC determine whether the packet is to be transmitted immediately or enqueued on the rate limited output queues for later transmission.

The primary output queues 3210 may be any type of queue stored entirely on the NIC. Each of these queues is associated with a specific priority. In some examples, there may be eight primary output queues 3210. However, one of ordinary skill in the art may realize that more or less output queues may be allocated as necessary.

In operation, packets may be enqueued on one of the primary queues 3210 when the look-up indicates that the packet is to be transmitted immediately. Accordingly, each of the primary output queues 3210A, 3210B, 3210C, and 3210D may be allocated to a particular class of network traffic, a priority associated with the network traffic.

Further, packets may be enqueued on one of the rate limited secondary output queues when the look-up indicates that the packet is to be further rate limited. As noted above, the rate limited secondary output queues may be located in a memory of the trusted host. Further, each of the secondary output queues may be allocated to handle a particular class of network traffic, a priority associated with the network traffic, or a specific destination (i.e. particular machines, another trusted host with a plurality of virtual machines, a storage area network, a specific data center, etc.) or any combination thereof. As discussed above, the secondary output queues may be invisible to the VMs.

Accordingly, classifying packets and deciding whether to enqueue the packets on either a primary output queue or a rate limited secondary output queue avoids using the NIC's memory (e.g. SRAM buffer) for packets that should be further rate limited. In this regard, the NIC classifies packets in a more efficient manner. Therefore, high packet flows that bypass a hypervisor yet still comply with rate limits set by the trusted host are achieved.

The scheduler 1250 may use a scheduling algorithm as described above to dequeue the packets from the secondary output queues and transmit the packets to an external device or network in accordance with the rate limit set for the class of traffic, the priority associated therewith, or the destination. As noted above, although only two secondary output queues are shown in FIG. 3A, one of ordinary skill in the art would recognize that more rate limited secondary output queues may be used.

FIG. 3B shows an example of the vNIC 2010 enqueuing at least one packet directly on the transmission queue 1210 allocated to VM 210 and transmitting the at least one packet through one of the primary output queues. In operation, the operating systems of the VMs 210, 220, and 230 transmit packets using vNIC 2010, 2020, and 2030, respectively. For example, the vNIC 2010 receives a packet from the operating system of VM 210. In this regard, one of ordinary skill in the art would recognize a one-to-one relationship between a VM and a transmission queue.

Turning to FIG. 3B, the scheduler 1250 may dequeue packets from the transmission queues 1210 and 1220 according to any known scheduling algorithm. In this regard, the packets are moved from their respective transmission queue to a special type of memory (i.e. on-chip buffer or SRAM) to generate the flow look-up key. Transferring the packet from the transmission queues may involve a direct memory access from the DRAM where the transmission queue is located to the high-speed memory of the NIC. The scheduler 1250 may place a portion of the packet in the high-speed memory of the NIC 1200. According to this example, the portion of the packet may be used as the transmission flow look-up key. Transmission flow look-up 1270 may then be performed on the packet.

In this regard, a processor of the NIC 1200 may generate a flow look-up key as described in greater detail below. The flow look-up key then may be compared to the entries stored in a flow look-up table 1290 to determine if the packet should be transferred immediately or delayed (to be discussed in greater detail below with respect to FIG. 3C). If the flow look-up table 1290 indicates that the packet should be transmitted immediately, the packet is placed on one of the primary output queues 3210 to be transmitted to the external network. Accordingly, a packet may be dequeued from the primary output queue 3210A and transmitted to external network 300 according to known techniques.

Figure 3C:
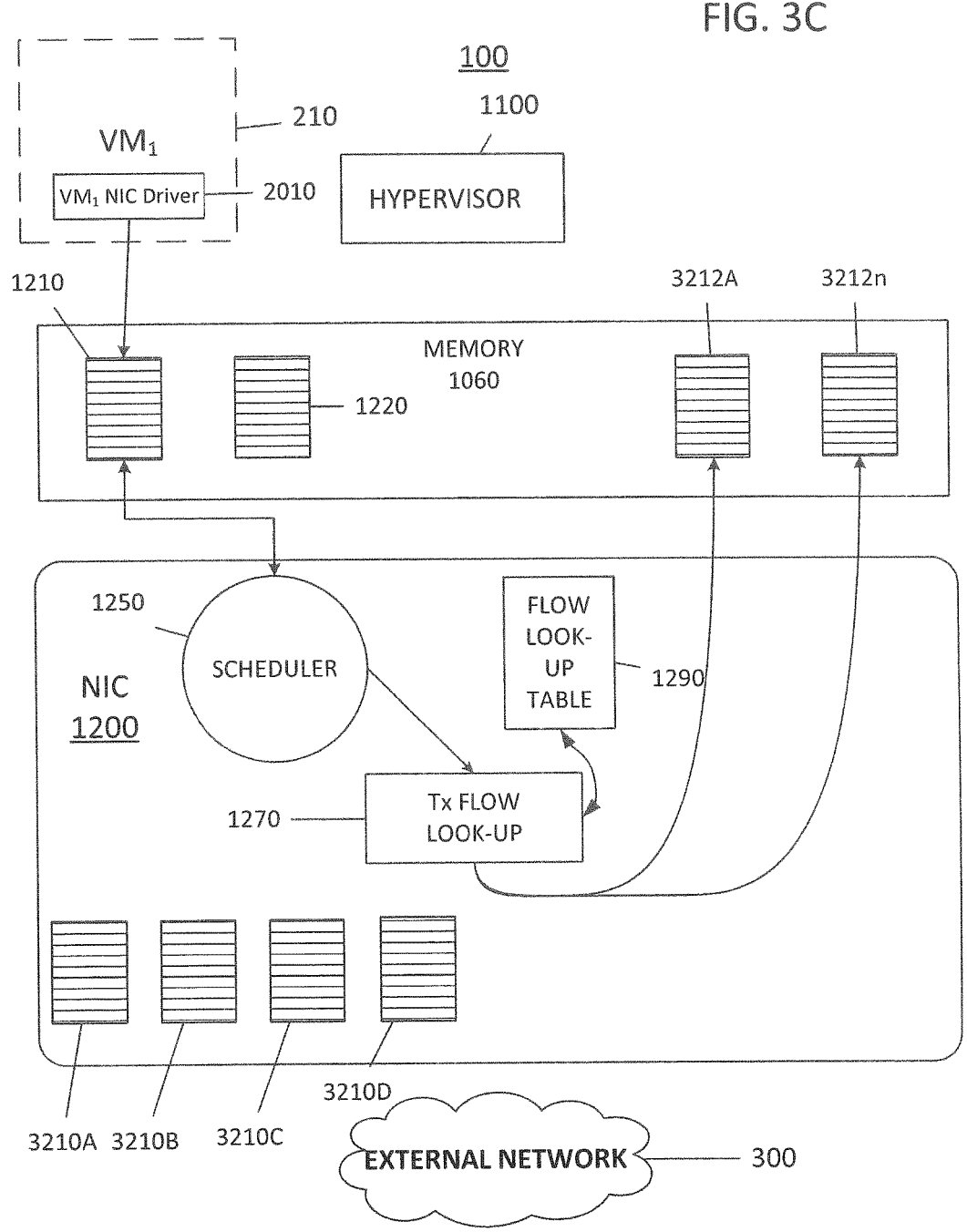

Turning to FIG. 3C, an example of when the flow look-up table 1290 indicates that the packet should be delayed is shown. In this regard, the VM 210 transmits a packet as described above. When the flow look-up table 1290 indicates that the packet should be further rate limited, the at least one packet is re-queued on one of the rate limited secondary output queues 3212A and 3212n. According to some examples, the flow look-up table 1290 may include additional information related to the packet, such as a class of the packet, a priority of the packet, or a rate limit for packets destined for certain destinations. In this regard, each of the rate limited secondary output queues 3212A and 3212n may be assigned to handle a different class of traffic, a different priority of traffic, or traffic intended for a specific destination. Thus, each packet will be handled in accordance with its corresponding rate-limit set by the trusted software. In some examples, the packet may be copied from the transmission queue to either one of the primary output queues or one of the rate limited secondary output queues.

In other examples, the NIC can avoid excessive direct memory access (DMA) transfers by using a pointer (e.g. queue descriptor). In this regard, only a prefix of the packet (i.e. enough to cover the packet headers of interest to the classifier) is DMA-ed into the NIC's memory (e.g. SRAM) for classification purposes. After the NIC performs the classification, the pointer may be updated to refer to the packet in the transmission queue for output purposes. When the secondary output queue's rate limiter allows, the packet will be DMA-ed from the transmission queue to the secondary output queue. This reduces the number of DMA transfers that the NIC would need to perform.

This example creates an issue in that the untrusted VM receives notification that the packet has been de-queued and transmitted from the transmission queue. However, the transmission queue may maintain the copy of the un-transmitted packet. In this regard, the untrusted VM cannot re-use this memory space until the packet has been de-queued from the transmission queue to the secondary output queue (which is invisible to the untrusted VM) because it may overwrite the un-transmitted packet.

In order to address this issue, the example described herein decouples the operation of de-queuing the packet from the transmission queue from the operation of notifying the untrusted VM that the memory space of the transmission queue is available for re-use. That is, the notification that the memory space is available for re-use is sent at a time after the notification of the de-queuing operation. In this regard, the notification that the memory space of the transmission queue is available for re-use may be done by delivering a "transmit complete" message that refers to the relevant transmission queue (e.g., memory address or a cookie value) to the untrusted VM. The untrusted VM may include a packet-reception queue to receive the notification that the memory space is available.

Figure 4A:
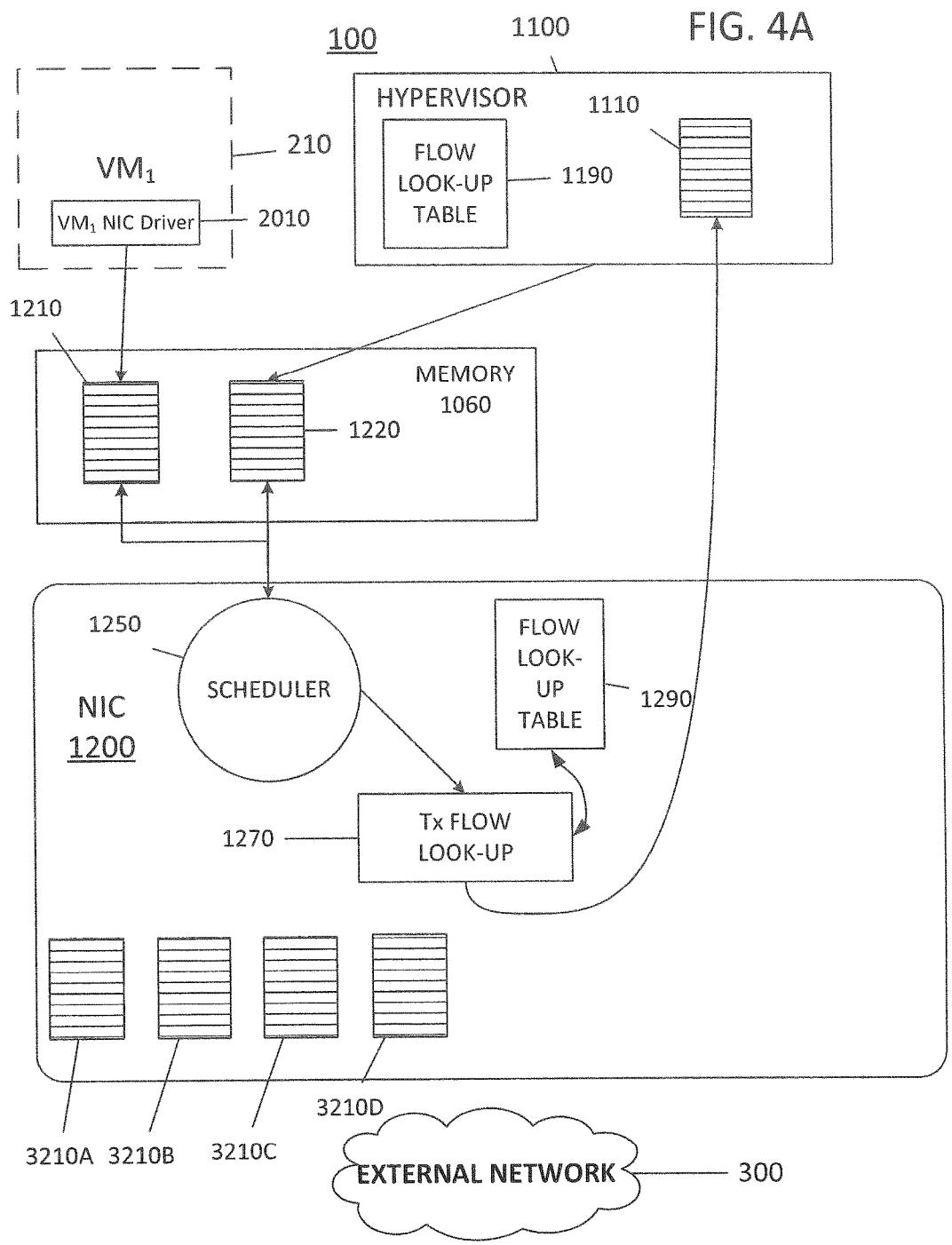

FIGS. 4A-4C shows another example where the NIC 1200 routes a packet that does not have an entry in the transmission flow look-up table 1270 to the hypervisor 1100 for further processing. As previously discussed, the trusted host 100 includes a processor (not shown), a memory 1060, a VM 210, a hypervisor 1100, and a NIC 1200. The VM 210 has a vNIC 2010, which includes a transmission look-up table (not shown).

The memory 1060 includes transmission queues 1210 and 1220 and the secondary output queues (not shown). In this regard, the transmission queue 1210 is allocated to VM 210 and the transmission queue 1220 is allocated to the hypervisor 1100. While FIG. 4A only shows two transmission queues, one of ordinary skill in the art would recognize that each VM may have a transmission queue allocated to it by the hypervisor 1100.

As mentioned above, the NIC 1200 includes a plurality of primary output queues 3210; a scheduler 1250; a transmission flow-look-up 1270; and a flow look-up table 1290. As noted above, each primary output queue 3210A, 3210B, 3210C, and 33210D may be dedicated to a particular class of network traffic, or a priority associated with the network traffic.

Referring to FIG. 4A, the vNIC 2010 will place a packet on its allocated transmission queue 1210 as described above. The scheduler 1250 will subsequently place at least a portion of the packet into a high-speed memory of the NIC 1200 via a direct memory access. The flow look-up is then performed by the NIC 1200. In this regard, a processor or fixed-function hardware may generate a flow look-up key according to any one of the techniques discussed below. The flow look-up key may then be used to refer to the flow look-up table 1290 to determine whether the packet should be delayed or transmitted immediately as discussed above. If the flow look-up key does not match any of the entries in the flow look-up table 1290, the NIC 1200 transfers the packet to software transmission queue 1110 of the hypervisor 1100 for further processing.

Turning to FIG. 4B, the hypervisor 1100 may perform a flow look-up on the at least one packet enqueued on the software transmission queue 1110. In this regard, the hypervisor 1100 will generate a flow look-up key as discussed below. The hypervisor 1100 will compare the generated flow look-up key to the entries stored in the flow look-up table 1190.

If the generated flow look-up key generated by the hypervisor 1100 does not match any of the entries stored in the flow look-up table 1190, then the hypervisor 1100 has several options. In this regard, the hypervisor 1100 may drop the packet. The hypervisor 1100 may generate a sequence of packets for the NIC 1200 to transmit immediately.

If the generated flow look-up key matches one of the entries in the flow look-up table 1190, the hypervisor may update the flow look-up table 1290. Additionally, the hypervisor 1100 may enqueue the packet on the transmission queue 1220 as shown in FIG. 4C. The NIC 1200 will handle the packets placed in transmission queue 1220 accordingly. That is, the scheduler 1250 will dequeue the packets from the transmission queue 1220 into the high-speed memory of the NIC 1200 as illustrated in FIGS. 3A-3C. In this regard, the processor of the NIC 1200 will generate another flow look-up key and compare it to the entries in the flow look-up table 1290. Accordingly, the generated flow look-up key will match one of the entries in flow look-up table 1290. The packet is either enqueued on one of the primary output queues 3210 to be transmitted to external network 300 immediately or enqueued on one of the secondary queues to be transferred according to the appropriate rate limit set by the trusted software.

In other examples, the hypervisor may software rate-limit the packet before transmitting it to transmission queue 1220. In this regard, the transmission queue 1220 may have a flag bit associated therewith. Accordingly, the hypervisor may set the flag bit to indicate that no further look-up is required by the NIC. Furthermore, the flag bit may indicate the primary output queue 3210 to be used to transmit the packet.

Figure 5B:
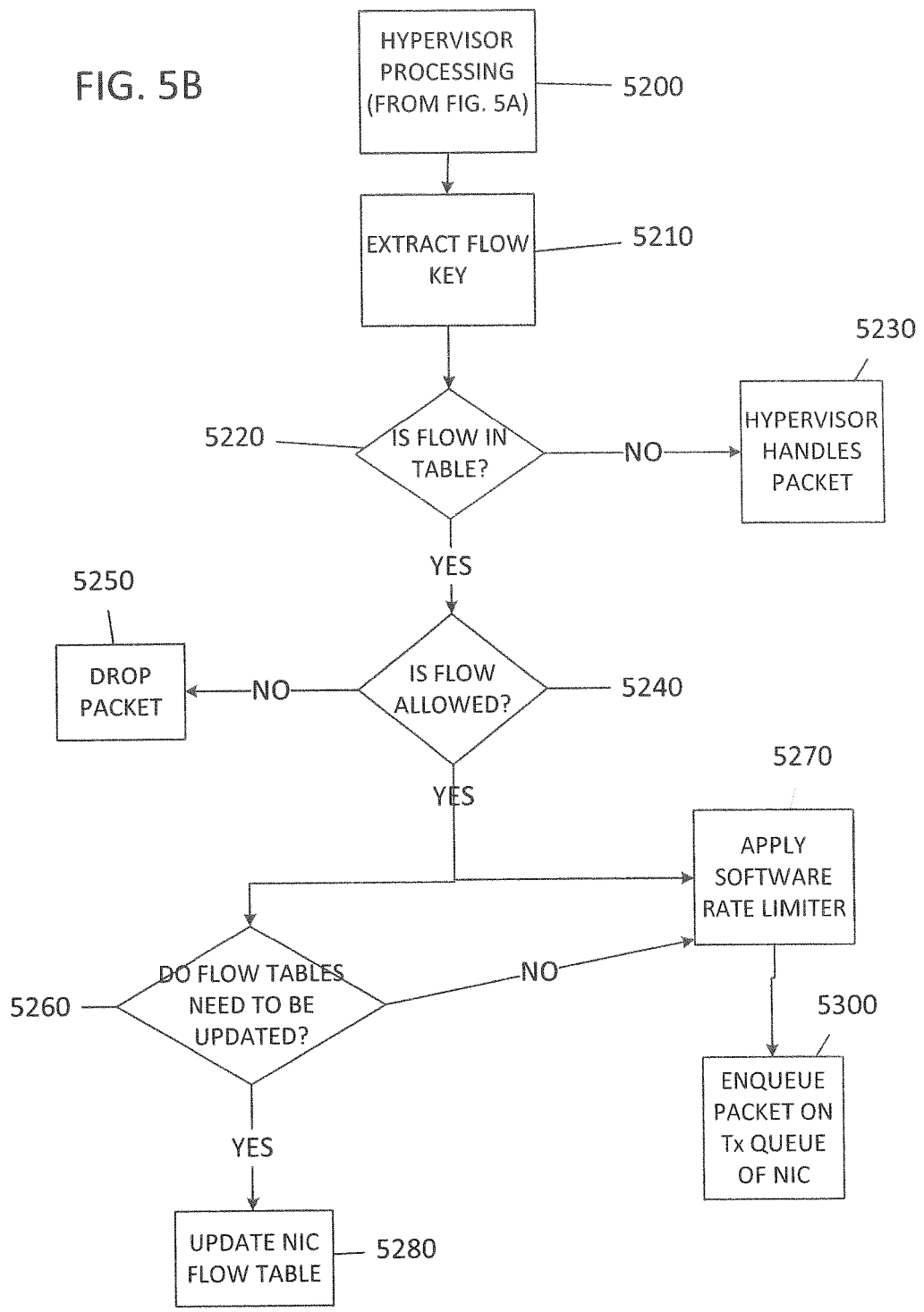

Turning to FIGS. 5A and 5B, a general flowchart of transmitting a packet according to the examples of the present application is shown. The process begins with a vNIC transmitting a packet in block 5010. In block 5020, the vNIC enqueues the packet on its allocated transmission queue. Accordingly, in block 5020 the vNIC may bypass the hypervisor to enqueue the packet directly on its allocated transmission queue. In some examples, the vNIC may passthrough the hypervisor in block 5020 to enqueue the packet.

In block 5030, a scheduler, as discussed above, dequeues at least a portion of the packet from the transmission queue. As noted above, any known scheduling algorithm (i.e. round robin) may be used to dequeue packets from the plurality of transmission queues associated with each VM.

Dequeuing packets from the transmission queues may involve transferring a portion of the packet from the memory of the trusted host to the NIC's high-speed memory via a direct memory access. As discussed above, the high-speed memory may be one of a SRAM, an on-chip buffer, or any other type of memory.

In block 5040, the processor of the NIC will extract a flow look-up key from the portion of the packet placed in the high-speed memory. The NIC may generate a flow-look up key from the portion of the packet placed in the high-speed memory.

Generally, the flow look-up key is generated using data extracted from a packet header. In some examples, the flow-look up key may be data extracted from the header, such as a destination address or a destination port, to compare to information in the flow look-up table. Additionally, information from the header, such as the source address, and subjected to a mathematical operation, such as a hash function, in order to generate the flow look-up key. Any combination of static information from the packet header may be extracted and subjected to a mathematical operation to generate the flow look-up key. In some examples, generating the flow look-up key may comprise concatenating information from the header.

In some examples, the flow look-up key may include a value placed in the packet by an application, the VM operating system, or the vNIC. According to these examples, a value may be placed in one of the available fields in the packet header. Accordingly, the location of the flow look-up key value in the packet header needs to be known to the NIC in order to perform the flow look-up.

Once the flow look-up key has been generated, the vNIC determines whether the flow look-up key is in a transmission flow look-up table stored in the vNIC in block 5030. In this regard, the transmission flow look-up table may be any suitable table or database capable of indexing and storing information for classifying the appropriate rate limited transmission queue for the packet. Accordingly, the transmission flow look-up table may be stored in CAM, TCAM, SRAM, or any other suitable memory.

In block 5050, the NIC will then use the flow look-up key to determine whether the packet has an entry in the flow look-up table. If the flow look-up key does not appear in the flow table of the NIC, then the packet is forwarded to be processed by the hypervisor in block 5200. In another example, the NIC may drop the packet without invoking the hypervisor if the flow look-up key does not appear in the flow look-up table.

If the look-up key generated for the packet matches one of the entries stored in the flow table, then the entry in the transmission flow look-up table is evaluated to determine whether the packet is to be transferred immediately in block 5060. If the look-up table indicates that the packet is to be transmitted immediately, the NIC places the packet on one of the primary output queues to be transmitted nearly immediately in block 5070.

However, if the transmission look-up table entry indicates that the packet is subject to rate limiting the packet is placed on one of the secondary output queues in block 5080. As noted above, there are a plurality of secondary output queues. Each secondary output queue may be for a certain class of rate limited traffic, a certain priority level of traffic, or intended for a particular destination. The secondary output queues can be any type of known queue, including first-in first-out; last-in first-out; transmission ring buffer, etc. Knowing the type of queue used, a scheduling algorithm will be used to dequeue the packets from the secondary output queues and transmit the packets to an external device or network in accordance with the rate limit set for the class of traffic, the priority associated therewith, or the destination as discussed above.

Turning to FIG. 5B, a flowchart describing how the hypervisor handles packets is shown. In block 5200, the hypervisor receives a packet from the NIC. In block 5210, the hypervisor will generate a flow look-up key from data contained in the packet according to one of the techniques discussed above. In other examples, the hypervisor may use information from the packet header to perform the flow look-up directly.

In block 5220, the hypervisor determines whether the flow look-up key is in a master transmission flow look-up table 1190 stored in the hypervisor. In this regard, the master transmission flow look-up table 1190 may be any suitable table or database capable of indexing and storing information for classifying the appropriate rate limited transmission queue for the packet.

If the flow look-up key is not in the master transmission flow look-up table 1190, the hypervisor will handle the packet in block 5230. That is, the hypervisor will further evaluate the packet. For example, if the packet is destined for a VM on the same trusted host, the hypervisor may route the packet to the destination VM. Additionally, the hypervisor may perform an analysis if whether the packet constitutes a new flow in block 5230. In this regard, the hypervisor determines if it has handled related packets. If not, the hypervisor determines that the packet corresponds to a new flow or a new class of traffic and creates an entry in the master transmission flow look-up table 1190, which subsequently updates the transmission flow look-up tables of the VMs and the NIC.

Further in block 5230, if the hypervisor determines that the packet does not belong to a new flow or a new class of traffic, then the hypervisor determines whether the packet should be transmitted. If the hypervisor determines that the packet should not be transmitted, the packet is dropped. If the hypervisor determines that the packet should be transmitted, the packet may be enqueued on a transmission queue allocated to the hypervisor.

When the flow look-up key is located in the master transmission flow look-up table, the method proceeds to block 5240 where the hypervisor determines if the packet complies with the policies set forth with respect to the class of rate limited traffic. As above with respect to block 5080, the packet may be compared to access control lists, rate limits set for the VM, rate limits set for the source-destination pair, or any other appropriate check. In some examples, block 5240 may be skipped and the packet may be placed on a rate limited secondary output queue.

After the packet has been verified in steps 5220 and 5240, the hypervisor enqueues the packet on an appropriate output queue in block 5300. The packet will be handled by the NIC according to the previously discussed examples.

Furthermore, the hypervisor will make a determination in block 5260 as to whether the flow look-up table of the NIC need to be updated to include additional flows of traffic. If the flow look-up table is to be updated the hypervisor will update the flow look-up table of the NIC in block 5280. In some examples, updating the flow look-up table in block 5280 includes imposing a rate limit to subsequent packets in this flow. If the flow look-up table is not to be updated, subsequent packets may pass through the hypervisor. In this regard, the packets may be software rate limited as shown in block 5270.

In some examples, updating the transmission flow look-up table of the NIC involves providing the hypervisor with means to access the transmission flow look-up table 1290. In this regard, the hypervisor may add/remove entries based on a variety of factors (e.g. knowing which entries are used more frequently than others). Various techniques for updating the transmission flow look-up tables would be readily apparent to those of ordinary skill in the art and are not discussed in greater detail herein.

In the above described examples, classifying a packet and then determining whether to transmit the packet immediately via a primary output queue or to re-queue the packet on a rate limited secondary output queue helps to de-allocate the NIC's memory (i.e., SRAM buffer) faster. Therefore, the NIC can classify packets in a more efficient manner, thereby allowing for high packet flows that comply with rate limits set by the trusted host.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
receiving at least one packet on at least one transmission queue assigned to a virtual machine (VM), the at least one transmission queue located on a memory of a host computing device;
classifying the at least one packet based on at least one entry in a transmission flow look-up table;
determining, using one or more processors of a network interface controller (NIC), whether the at least one packet should be transmitted immediately or delayed based on its classification; and
in response to determining that the at least one packet should be delayed, re-queuing the at least one packet on one of a plurality of rate limited secondary output queues located on the memory of the host computing device.

2. The method of claim 1, further comprising:
in response to determining that the at least one packet should be transmitted immediately, re-queuing the at least one packet on a primary output queue.

3. The method of claim 1, wherein the plurality of rate limited secondary output queues are not accessible by a virtual machine.

4. The method of claim 1, further comprising:
copying the at least one packet from the at least one transmission queue to an output queue.

5. The method of claim 1, wherein re-queuing the at least one packet on one of the plurality of rate limited secondary output queues further comprises:
updating a queue descriptor to point to the at least one packet in the at least one transmission queue.

6. The method of claim 5, further comprising:
sending a transmit complete message at a time after a notification of the re-queuing.

7. A system comprising:
at least one memory of a host computing device, the at least one memory storing:
at least one transmission queue adapted to receive at least one packet from a virtual machine (VM); and
a transmission look-up table; and
at least one rate limited secondary output queue; and
one or more processors of the host computing device in communication with the at least one memory, the one or more processors adapted to:
classify the at least one packet based on at least one entry in a transmission flow look-up table;
determine whether the at least one packet should be delayed or transmitted immediately; and
in response to determining that the at least one packet should be delayed, re-queue the at least one packet on the at least one rate limited secondary output queue.

8. The method of claim 1, wherein the plurality of rate limited secondary output queues are assigned to handle different categories of packets according to the transmission flow look-up table.

9. The method of claim 8, wherein the different categories of packets include at least one of a class of network traffic, a priority associated with a network traffic, or a destination associated with a network traffic.

10. The method of claim 1, wherein each of the plurality of rate limited secondary output queues are rate limited according to a different rate limit.

11. The method of claim 1, wherein the memory of the host computing device in which the plurality of rate limited secondary output queues is located is a volatile memory.

12. The system of claim 7, wherein the at least one rate limited secondary output queue is not accessible by the virtual machine.

13. The system of claim 7, wherein re-queueing the at least one packet on the at least one rate limited secondary output queue further comprises:
    updating a queue descriptor to point to the at least one packet in the at least one transmission queue.

14. The system of claim 7, further comprising:
    at least one primary output queue adapted to receive the at least one packet when the one or more processors determine that the at least one packet is determined to be transmitted immediately.

15. The system of claim 7, further comprising:
    a scheduler adapted to transfer the at least one packet from the at least one transmission queue to a memory.

16. A non-transitory computer readable medium comprising instructions executable by one or more processors on a host computing device to:
    receive at least one packet on at least one transmission queue assigned to a virtual machine (VM);
    classify the at least one packet based on at least one entry in a transmission flow look-up table;
    determine whether the at least one packet should be delayed or transmitted immediately based on its classification; and
    in response to determining that the at least one packet should be delayed, re-queue the at least one packet on one of a plurality of rate limited secondary output queues.

17. The non-transitory computer readable medium of claim 16, further comprising instructions that:
    in response to determining that the at least one packet should be transmitted immediately, copy the at least one packet on at least one of a plurality of primary output queues.

18. The non-transitory computer readable medium of claim 16, further comprising instructions that:
    update a queue descriptor to point to the at least one packet in the at least one transmission queue when the at least one packet is re-queued on the plurality of rate limited secondary output queue.

19. The non-transitory computer readable medium of claim 18, further comprising instructions that:
    send a transmit complete message at a time after a notification of the re-queuing.

* * * * *